United States Patent
Chen

(10) Patent No.: US 7,570,610 B2
(45) Date of Patent: Aug. 4, 2009

(54) POWER MANAGEMENT METHOD

(75) Inventor: Sheng-Chung Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 618 days.

(21) Appl. No.: 11/344,808

(22) Filed: Feb. 1, 2006

(65) Prior Publication Data

US 2007/0177534 A1 Aug. 2, 2007

(51) Int. Cl.
*H04B 7/185* (2006.01)
(52) U.S. Cl. .................. 370/318; 370/338; 370/310; 455/522
(58) Field of Classification Search ............ 455/41.2, 455/522, 69, 754; 370/310–318, 338
See application file for complete search history.

(56) References Cited

U.S. PATENT DOCUMENTS

2006/0114826 A1* 6/2006 Brommer .................... 370/230
2006/0285528 A1* 12/2006 Gao et al. ................... 370/338
2007/0037600 A1* 2/2007 Fukuda ...................... 455/522
2007/0076675 A1* 4/2007 Chen .......................... 370/338

* cited by examiner

*Primary Examiner*—Kamran Afshar
(74) *Attorney, Agent, or Firm*—Thomas, Kayden, Horstemeyer & Risley

(57) ABSTRACT

A power management method. The power management method for a wireless network having a plurality of stations (STAs) comprises receiving a data frame, detecting a destination STA in accordance with the data frame, and entering a low power state if not the destination STA for a first power-save (PS) duration determined according to a network allocation vector (NAV) of each STA not the destination STA, updated with a duration information of the received data frame duration determined according to a network allocation vector (NAV) of the data frame.

54 Claims, 11 Drawing Sheets

US 7,570,610 B2

POWER MANAGEMENT METHOD

BACKGROUND OF THE INVENTION

1. Field of the Invention

The invention relates to power management method and power management device, and more specifically to power management method and power management method for stations (STAs) in wireless LANs (local area- networks).

2. Description of the Related Art

Recently, wireless local area networks (LANs) have been developed as an enhanced replacement for wired LANs. As compared to wired LANs, data-communication in a wireless LAN can be more versatile due to the flexibility of the arrangement of network stations in the area covered by the LAN, and due to the absence of cabling connections.

Wireless LANs are generally implemented according to the standard defined by the ISO/IEC 8802-11 international standard (IEEE 802.11) for wireless systems operating in the 2.4-2.5 GHz ISM (industrial, scientific and medical) band. FIG. 1 illustrates the general MAC frame format defined in IEEE 802.11. Each MAC frame includes a MAC header, a variable length frame body and a frame check sequence (FCS). As shown, the MAC header includes Frame Control, Duration/ID, Address 1, Address 2, Address 3, Sequence Control, and Address 4 fields. The address fields in MAC frame format are used to indicate the Basic Service Set identifier (BSSID), Source address (SA), Destination Address (DA), Transmitter Address (TA), and Receiver Address (RA). Thus, when receiving data frames transmitted in the wireless LANs, station (STAs) operating in a service set can detect the packets transmitted over a wireless media (WM), determining the intended recipient in accordance with the destination information thereof. Thus, a station's receiver is always powered on, waiting for data frames. However, since most STAs in the wireless network are mobile stations which may be battery powered, power management becomes an important consideration in performance analysis. IEEE 802.11 provides a mechanism to support establishment and maintenance of the power management mode of a STA, wherein a STA may be in one of two different power states, Awake and Doze. The STA in Awake state is fully powered, while the STA in Doze state is not able to transmit or receive and consumes very low power. STAs in a power-save (PS) mode provided in IEEE. 802.11 operate in the Doze state and enter the Awake state at a determined time. When a STA operates in the PS mode, the AP (access point) does not arbitrarily transmit data frames thereto, but buffers the data frames and only transmits them at designated times. The STAs that currently have buffered data frames within the AP are identified in a TIM (traffic indication map), included within all beacons generated by the AP. The STAs in the PS modes periodically monitors beacons and determine whether a data frame is buffered therefore by receiving and interpreting a TIM included therein. If the TIM element in the most recent beacon indicates directed data buffered for the STA, the STA sends PS-Poll frames to the AP. The AP transmits buffered directed data frames to a PS STA in response to the PS-Poll from that STA. FIG. 2 shows a schematic diagram illustrating the AP and STA activity in a power management operation. The top line in FIG. 1 represents the time axis, with the beacon interval shown together with a DTIM (delivery TIM) Interval of three beacon intervals. The second line depicts AP activity. The AP schedules beacons for transmission every beacon interval and transmits a TIM with every beacon. The beacons contain TIMs, some of which may be DTIM, wherein the difference between TIM and DTIM is that after a DTIM, the AP sends out the buffered broadcast/multicast packets. The third line in FIG. 1 depicts the activity of a STA operating in PS mode. The STA represented in the third lines powers up its receiver, which is indicated as a ramp-up of the receiver power and receives a TIM in the first beacon; that TIM indicates the presence of a buffered packet for the receiving STA. The receiving STA then generates a PS-Poll frame, which elicits transmission of the buffered data from the AP. Broadcast and multicast data frames are sent by the AP subsequent to the transmission of a beacon containing a DTIM.

This power management method, however, is not advantageous for STAs having data to be transmitted; since when a STA operates in PS mode, AP buffers the data frames for the STA and transmits thereto when it wakes (Awake state). Thus, for STAs having much data to be received, considerable data is buffered within the AP, which then may be lost if the data amount exceeds capability of the AP. Moreover, as shown in FIG. 1, since the first TIM indicating there is data designated to a STA, the STA enters Awake state, waiting to receive the designated data until the completion of the transmission. Thus the STA needs to operate in Awake state in the first three beacon intervals, consuming power. Moreover, in practice, STAs usually do not adopt this power management method, since the STAs need to ensure there is no data to receive or transmit when in PS mode, and it is power-consuming to receive every data frames transmitted over the WM, which may not contain the designated data.

BRIEF SUMMARY OF THE INVENTION

A detailed description is given in the following embodiments with reference to the accompanying drawings.

The invention is generally directed to a power management method for a plurality of stations (STAs) in a Wireless Local Area Network (WLAN). An exemplary embodiment of a power management method comprises receiving a data frame, detecting a destination STA in accordance with the data frame, and entering a low power state if not the destination STA for a first power-save (PS) duration determined according to a network allocation vector (NAV) of each STA not the destination STA, updated with a duration information of the received data frame.

Another power management method is provided. The power management method for a plurality of stations (STAs) in a Wireless Local Area Network (WLAN) comprises receiving a data frame, detecting a destination STA in accordance with the data frame, whether a network allocation vector (NAV) of each STA not the destination STA, updated with a duration information of the received data frame, comprises more than one ACK frame interval, and entering a low power state if not the destination STA for a first PS. duration determined according to the NAV thereof.

A power management device for a plurality of stations (STAs) in a Wireless Local Area Network (WLAN) is provided. The power management device comprises means for receiving a data frame; means for detecting a destination STA in accordance with the data frame; means for determining if the destination STA; and means for entering a low power state if not the destination STA for a first power-save (PS) duration determined according to a network allocation vector (NAV) of each STA not the destination STA, updated with a duration information of the received data frame.

Another power management device is provided. The power management. device comprises means for receiving a data frame; means for detecting a destination STA. in accordance with the data frame; means for determining if the destination STA; means for determining whether a network allocation vector (NAV) of each STA not the destination STA, updated with a duration information of the received data frame, comprises more than one ACK frame interval; and means for entering a low power state if not the destination STA for a first PS duration determined according to the NAV thereof.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
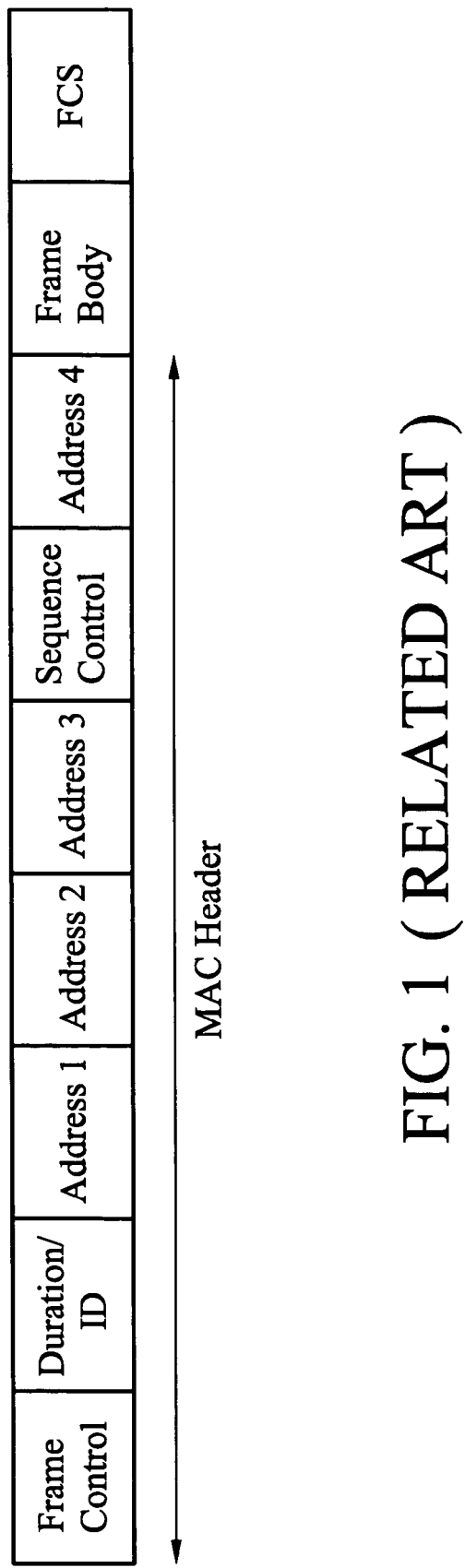
FIG. 1 is a schematic diagram of the general MAC frame format defined in IEEE 802.11.
Figure 2:
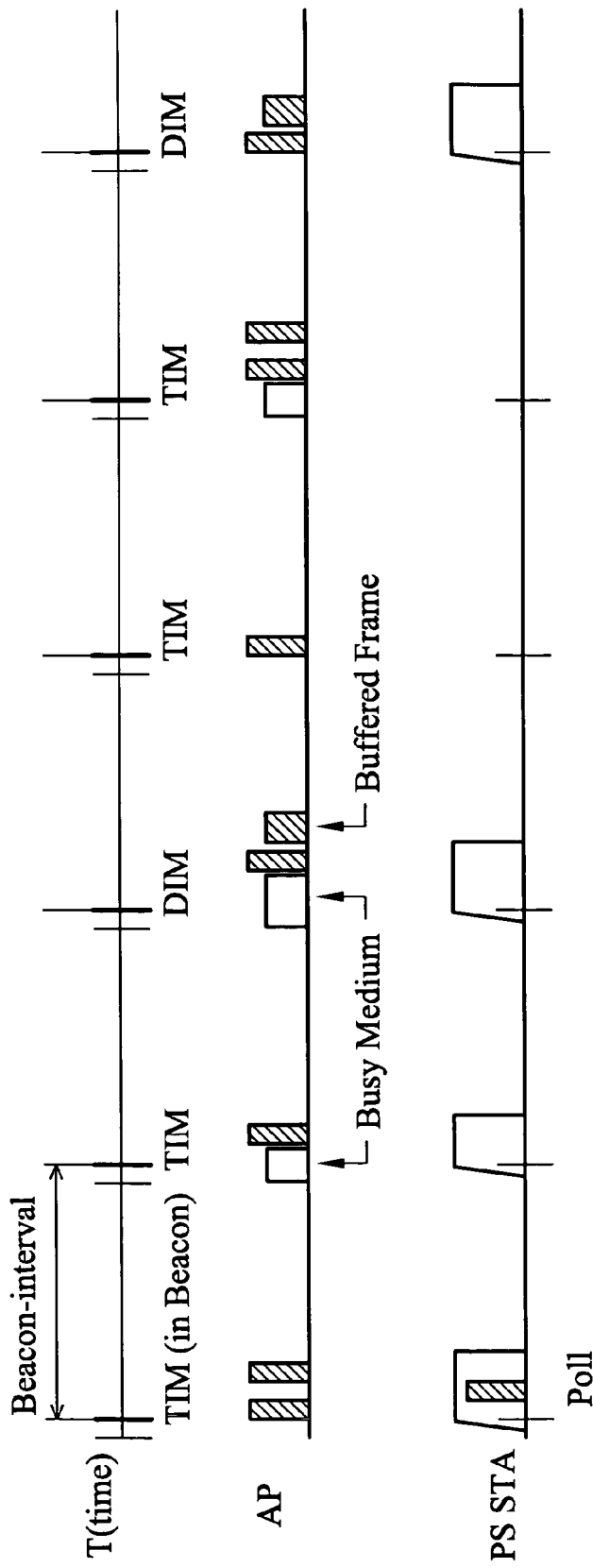
FIG. 2 is a schematic diagram illustrating AP and STA activity in the power management operation of IEEE 802.11.
Figure 3:
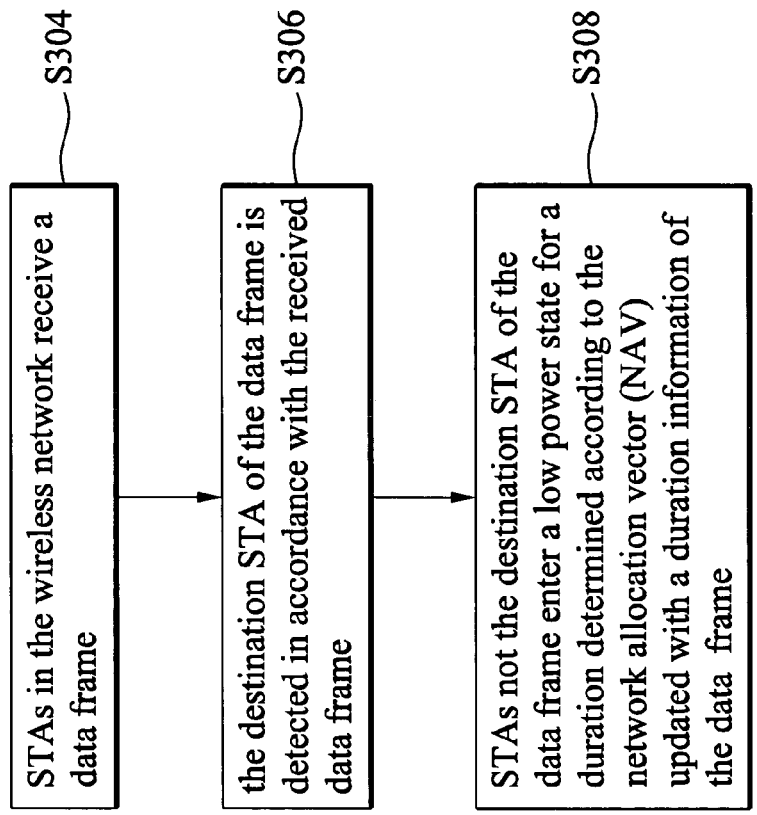
FIG. 3 is a flowchart of a power management method 200 for a wireless network having a plurality of stations (STAs) according to an embodiment of the invention.

FIG. 3 is a flowchart of a power management method 300 or a plurality of stations (STAs) in a Wireless Local Area Network (WLAN) according to an embodiment of the invention. It is noted that the STAs in embodiments of the invention may comprise an access point (AP). In step 304, STAs in the wireless network receive a data frame. As stated previously, stations in the same service set can detect the destination STA in accordance with the address fields of received data frame (step 306). Further, IEEE 802.11 provides a Virtual Carrier-sense mechanism for the STAs to predict the future traffic on the medium by updating their network allocation vector (NAV) with the duration information in the Duration/ID field of the received data frame with the exception of the STA to which the data frame is addressed. Thus, after updating their NAVs according to the data frame, other STAs not the destination station can enter a low power state for a duration determined according to the network allocation vector (NAV) based on the duration information of the data frame (step 308). After the duration, the STAs enter a fully powered state.

It is noted that the STAs operating in the low power state do not transmit or receive frames.

Figure 4A:
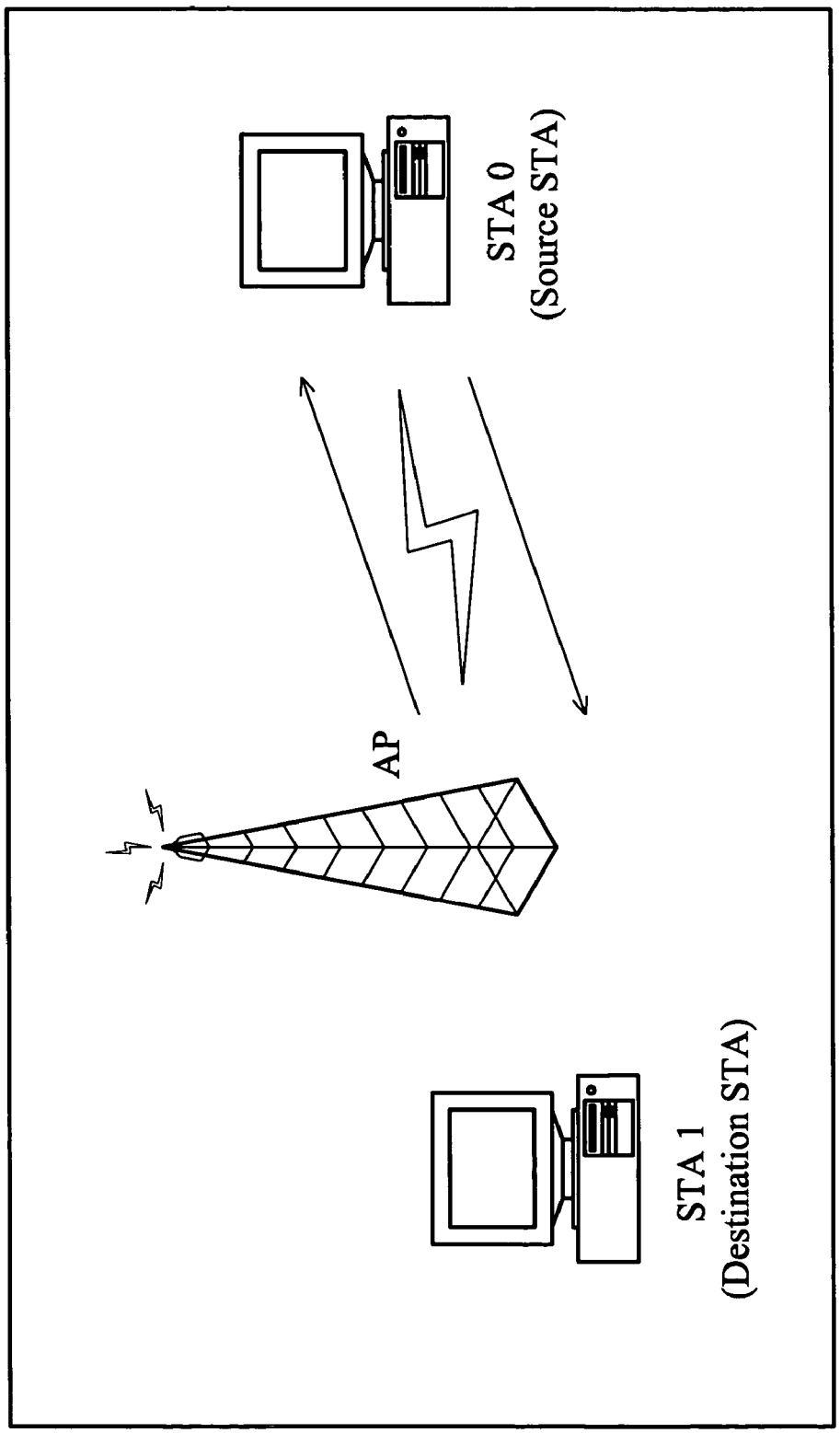
FIGS. 4A and 4B are schematic diagrams of an infrastructure wireless LAN and an ad-hoc wireless LAN respectively.
Figure 4B:
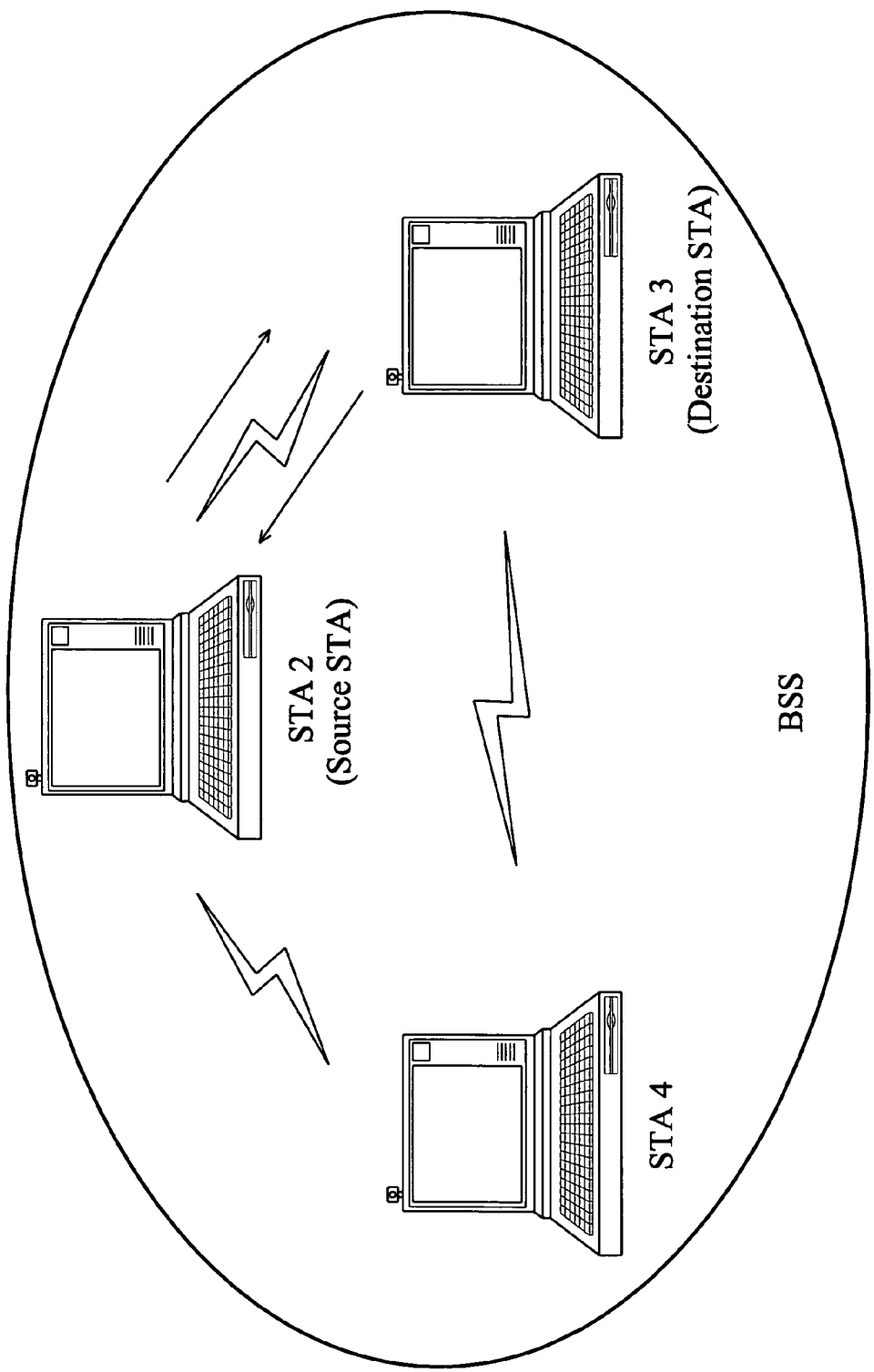

FIG. 4A is a schematic diagram of an infrastructure wireless LAN having two stations, STA0 and STA1 and an AP. When STA0 transmits a Data 0 to the AP, that is STA0 is the source station and AP is the destination station, other stations, such as STA1, can enter the low power state utilizing the power management method of the invention. FIG. 4B is a schematic diagram of an ad-hoc wireless LAN having three stations, STA2~4. When STA2 transmits a Data 0 to the STA3, that is STA2 is the source station and STA3 is the destination station, similarly, other stations, such as STA4, can enter the low power state utilizing the power management method of the invention. The detailed activity of the Source and Destination stations of FIG. 4 is discussed with respect to different transmission modes utilized when transmitting Data 0 by the STA0 and design necessity in the following.

Figure 5:
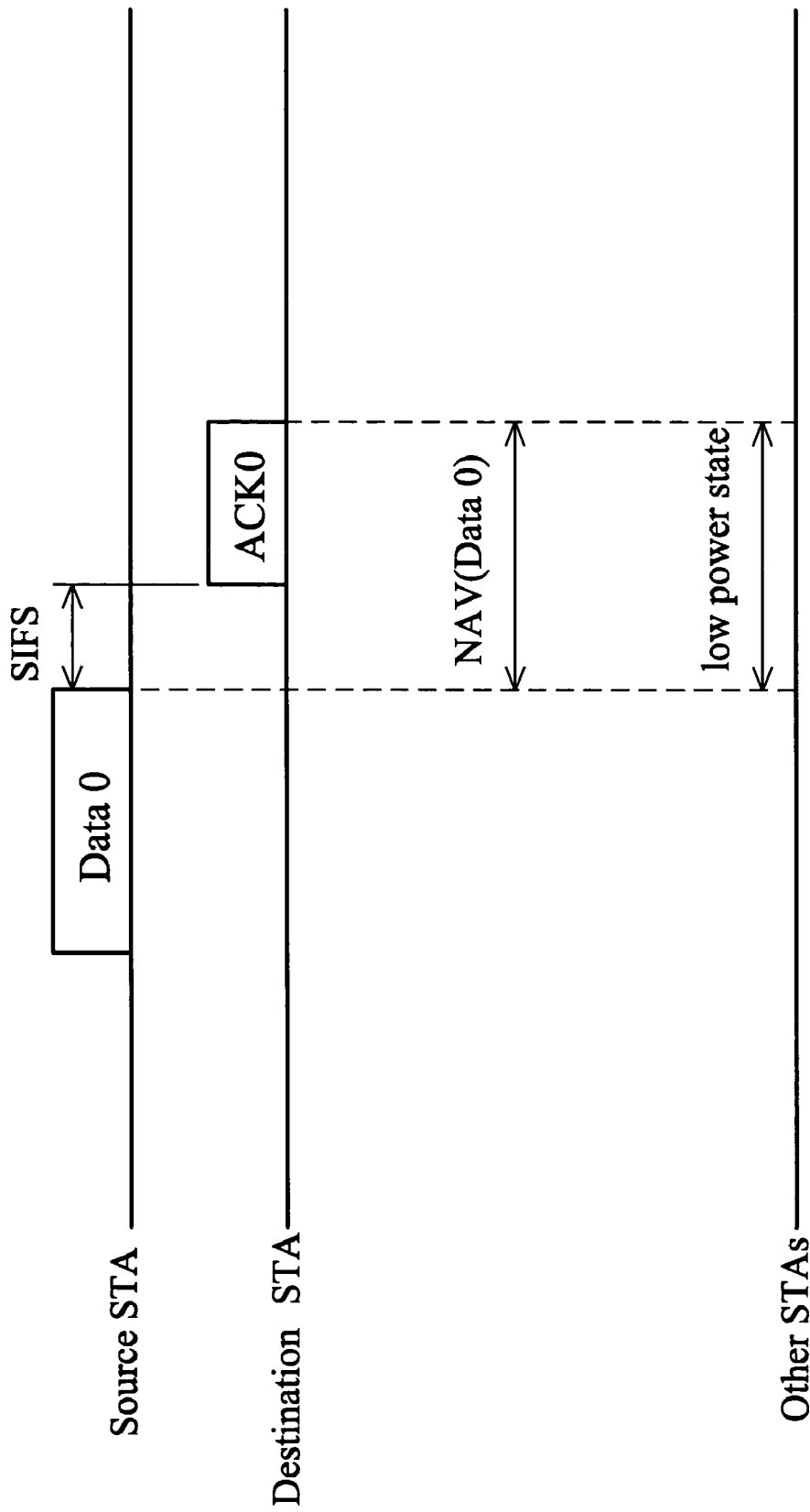
FIG. 5 is a schematic diagram illustrating the activity of STAs in a non-fragment data transmission according to an embodiment of the invention.

FIG. 5 is a schematic diagram illustrating the activity of STAs of FIG. 4 in a non-fragment data transmission according to an embodiment of the invention. The top, second and third lines represent the activity of the source STA, destination STA and other STAs respectively, and the part between the second and third lines depicts the intervals of NAV updated with the duration information of the data frame. When all STAs including the AP in FIG. 4A in the same service set receive the data frame, Data 0, transmitted by the source STA, the destination STA of Data 0, can be detected therefrom. The destination STA then replies to the source STA with an acknowledgement (ACK) frame subsequent to a short interframe space (SIFS) interval in acknowledgement of the reception of Data 0. Thus, other STAs except for the destination STA, may enter the low power state for the duration of NAV updated with the duration information of Data 0 which is represented by NAV(Data 0) and comprises one SIFS interval plus one ACK frame interval. It is noted that the data type of the transmission in FIG. 5 is a single Mac service data unit (MSDU), however, a MSDU may be partitioned into multiple fragments for transmission, defined as a burst of MPDU (Mac Protocol Data Unit) transmission. For example, Data 0 may be partitioned into N fragments, Fragment 0, Fragment 1, . . . , and Fragment N. Further, in IEEE 802.11e, multiple frames may also be transmitted as a burst of MSDU transmission which are similar to a burst of MPDU transmission shown in FIG. 5 except that "Fragment 0~N" in FIG. 5 would be frames in a burst of MSDU transmission.

Figure 6:
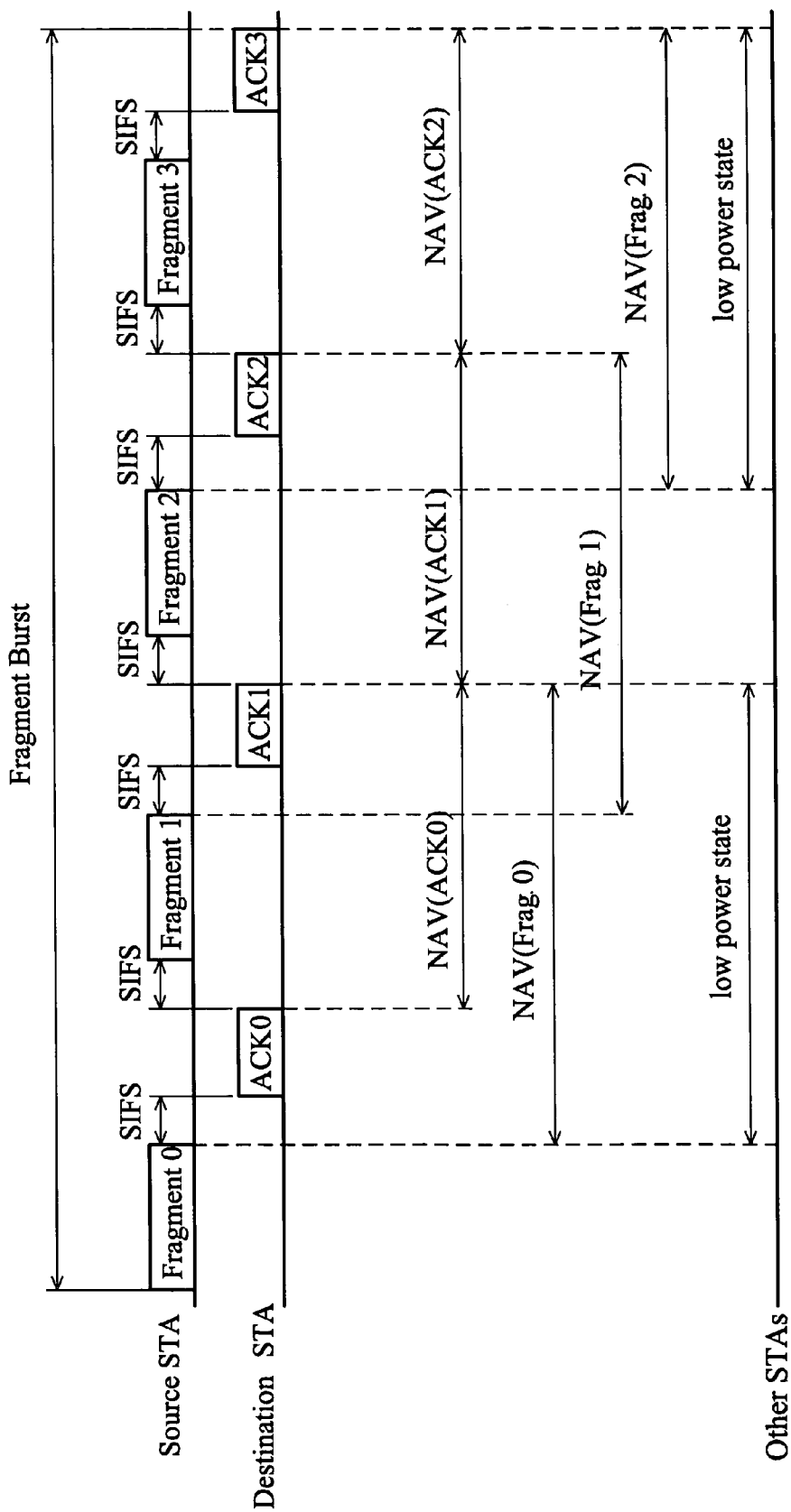
FIG. 6 is a schematic diagram illustrating the activity of STAs in a burst of MPDU transmission according to another embodiment of the invention.

FIG. 6 is a schematic diagram illustrating the activity of STAs of FIG. 4 in a burst of MPDU (Mac Protocol Data Unit) transmission according to another embodiment of the invention. The top, second and third lines depict the activity of the source STA, and destination STA and other STAs respectively. It is observed that the source station sends fragments of Data 0 until all fragments thereof have been sent to the destination STA which replies to the source STA with an ACK frame for each fragment subsequent to a SIFS interval. Upon receiving an ACK frame from the destination STA, the source STA proceeds to transmit the next fragment immediately following the ACK frame. The part between the third and third lines of FIG. 6 represents the NAV updated with the duration information of each fragment or ACK frame. In a burst of MPDU transmission, the NAV updated with the duration information of a fragment comprises the intervals of two ACK frames and a subsequent fragment, plus three SIFS intervals and the NAV updated with the duration information of an ACK frame transmitted in response to the received fragment comprises the intervals of one ACK frame and a subsequent fragment, plus two SIFS intervals. Since the NAV updated with the duration information of a fragment comprises more than one ACK frame interval, when receiving a data frame or a fragment thereof, if there is more than one ACK frame interval contained in the NAV updated with the duration information of the data frame or a fragment thereof, it indicates it is a burst of MPDU transmission. Thus, once receiving the fragment, the other STAs not the destination STA may enter the low power state according to the NAV updated with the duration information of the received fragment. In the case shown in FIG. 6, the other STAs not the destination STA may enter the low power state after receiving fragment 0 for a duration of the NAV value updated with the duration information of the fragment 0, NAV(Frag. 0), which is the intervals of two ACK frames and the fragment 1, plus three SIFS intervals. The STAs entering the low power state may enter a fully powered state after the duration, and the low power state again after receiving the fragment 2 for a duration of NAV(Frag. 2).

Figure 7:
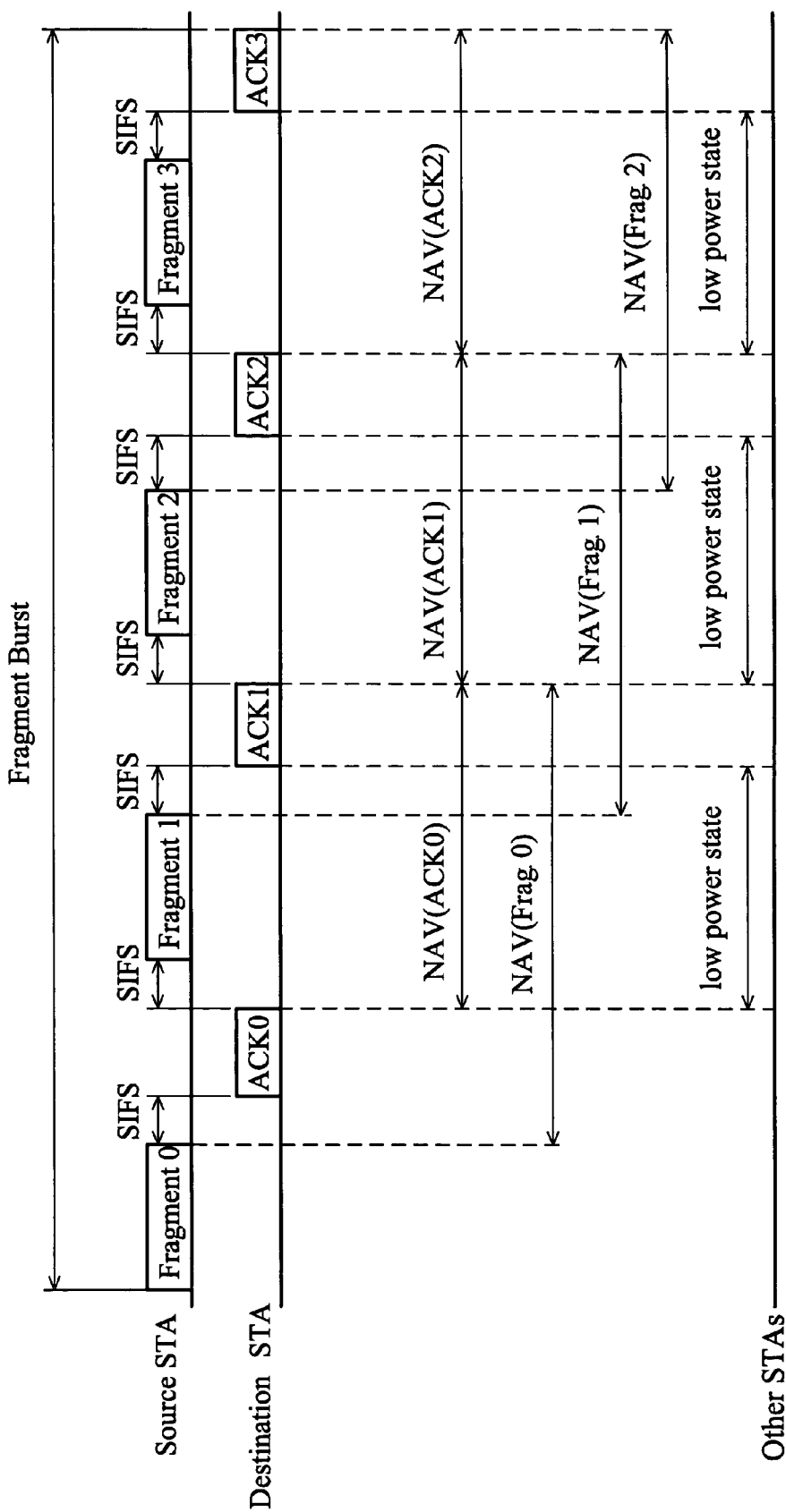
FIG. 7 is a schematic diagram illustrating the activity of STAs in a burst of MPDU transmission according to another embodiment of the invention.

The power management method of the invention can be further employed in different ways in accordance with design necessity. FIG. 7 is a schematic diagram illustrating the activity of STAs of FIG. 4 in a burst of MPDU transmission according to another embodiment of the invention. The activities of the source, destination STAs and the NAV value updated with the duration information of a fragment or an ACK frame are similar to those shown in FIG. 6, and thus are not further described. In this case, the other STAs not the destination STA may enter the low power state according to the NAV updated with the duration information of a fragment. For example, the STAs enter the low power state in response to the end of an ACK frame, ACK 0, transmitted in response to the fragment 0 for a duration of the NAV( Frag. 0) minus two ACK frames intervals and one SIFS interval; that is the NAV(ACK 0) minus one ACK frame interval. The STAs operating in the low power states may enter a fully power state after the duration and receive an ACK frame, ACK 1, transmitted in response to the fragment 1. The STAs then enter the low powered state again for a duration of NAV( Frag. 1) minus two ACK frames intervals and one SIFS interval, that is the NAV(ACK 1) minus one ACK frame interval. Similarly, after the duration, the STAs enter fully power sate and receive the ACK frame, ACK2, transmitted in response to the fragment 2. The STAs then also enter the low powered state again for a duration of the NAV( Frag. 2) minus two ACK frames intervals and one SIFS interval (i.e. NAV (ACK 2) minus one ACK frame interval).

Figure 8:
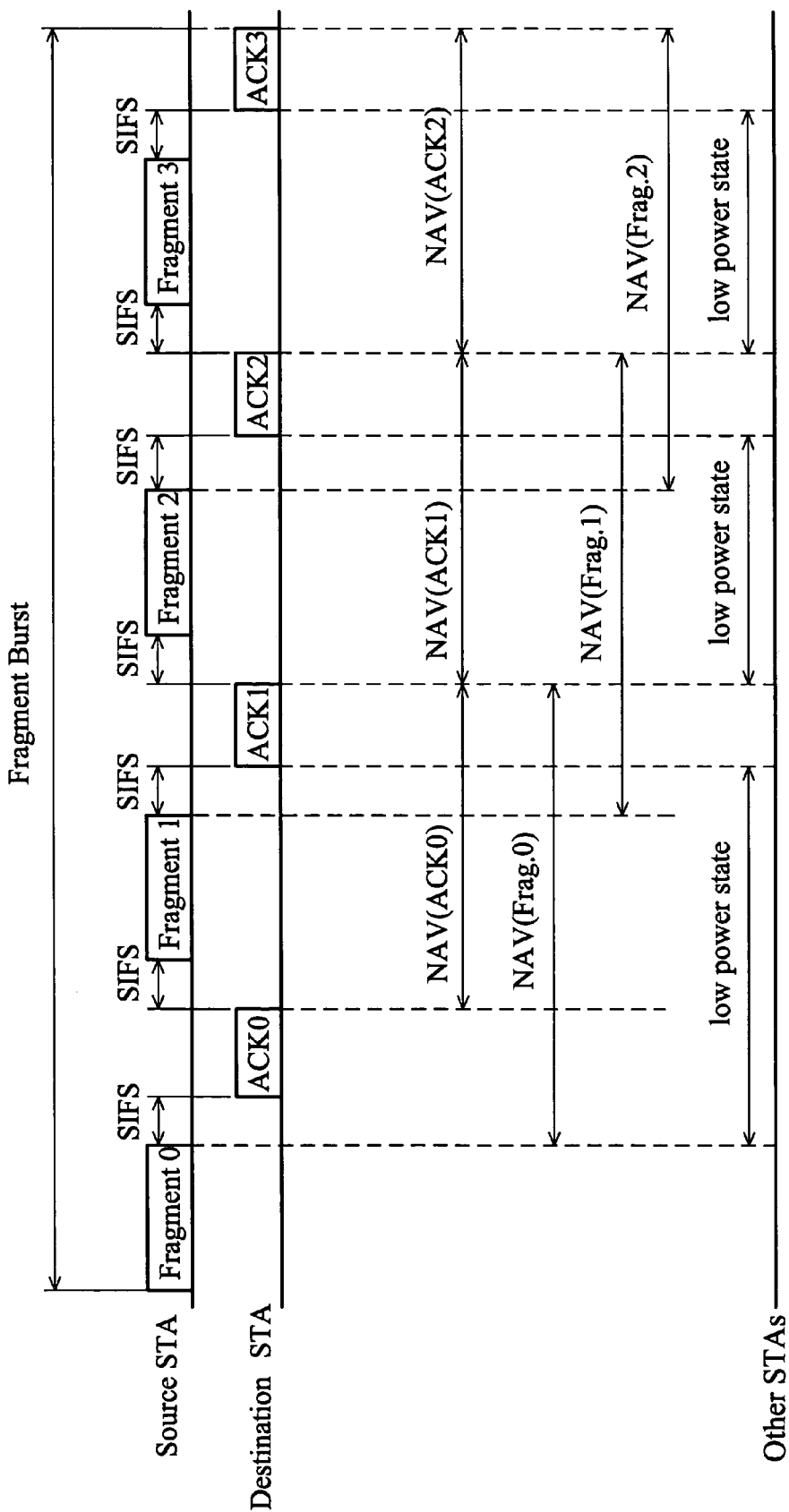
FIG. 8 is a schematic diagram illustrating the activity of STAs in a burst of MPDU transmission according to another embodiment of the invention.

FIG. 8 shows the activity of STAs of FIG. 4 in a burst of MPDU transmission according to another embodiment of the invention. Similarly, the activities of the source and destination STAs and the NAV value update with duration information of a fragment or an ACK frame are similar to that shown in FIG. 6, and therefore are not further described. When receiving the fragment 0, the other STAs not the destination STA may enter the low powered state for a duration of NAV value updated with the duration information of the fragment 0, NAV( Frag 0), minus one ACK frame interval. The STAs operating in the low power state may enter a fully power state after the duration and receive the ACK frame, ACK 1, transmitted in response to the fragment 1. The STAs then enter the low power state again for duration of NAV( Frag. 1) minus two ACK frames intervals and one SIFS interval (i.e. NAV (ACK 1) minus one ACK frame interval) as the case in FIG. 7. Similarly, after the duration, the STAs enter fully powered sate and receive the ACK frame, ACK2, transmitted in response to the fragment 2. The STAs then also enter the low power state again for duration of NAV( Frag. 2) minus two ACK frames intervals and one SIFS interval (i.e. NAV (ACK 2) minus one ACK frame interval). The difference between FIGS. 7 and 8 is that after reviving the fragment 0, the STAs not the destination STA in FIG. 7 do not enter the low power state until receiving ACK 0 whereas STAs in FIG. 8 enter the low power state immediately subsequent to the transmission of fragment 0. Moreover, the duration of the STAs entering low power state after receiving the fragment 0 in FIG. 7 is the NAV(Frag. 0) minus two ACK frames intervals and one SIFS interval (i.e. NAV(ACK 0) minus an ACK frame interval), while in FIG. 8, the duration is NAV(Frag. 0) minus an ACK frame interval. It is noted that in IEEE 802.11e, the operation of the power management method of the invention is similar to the described operation except that the data type in IEEE 802.11e may be multiple frames instead of multiple fragments.

Figure 9:
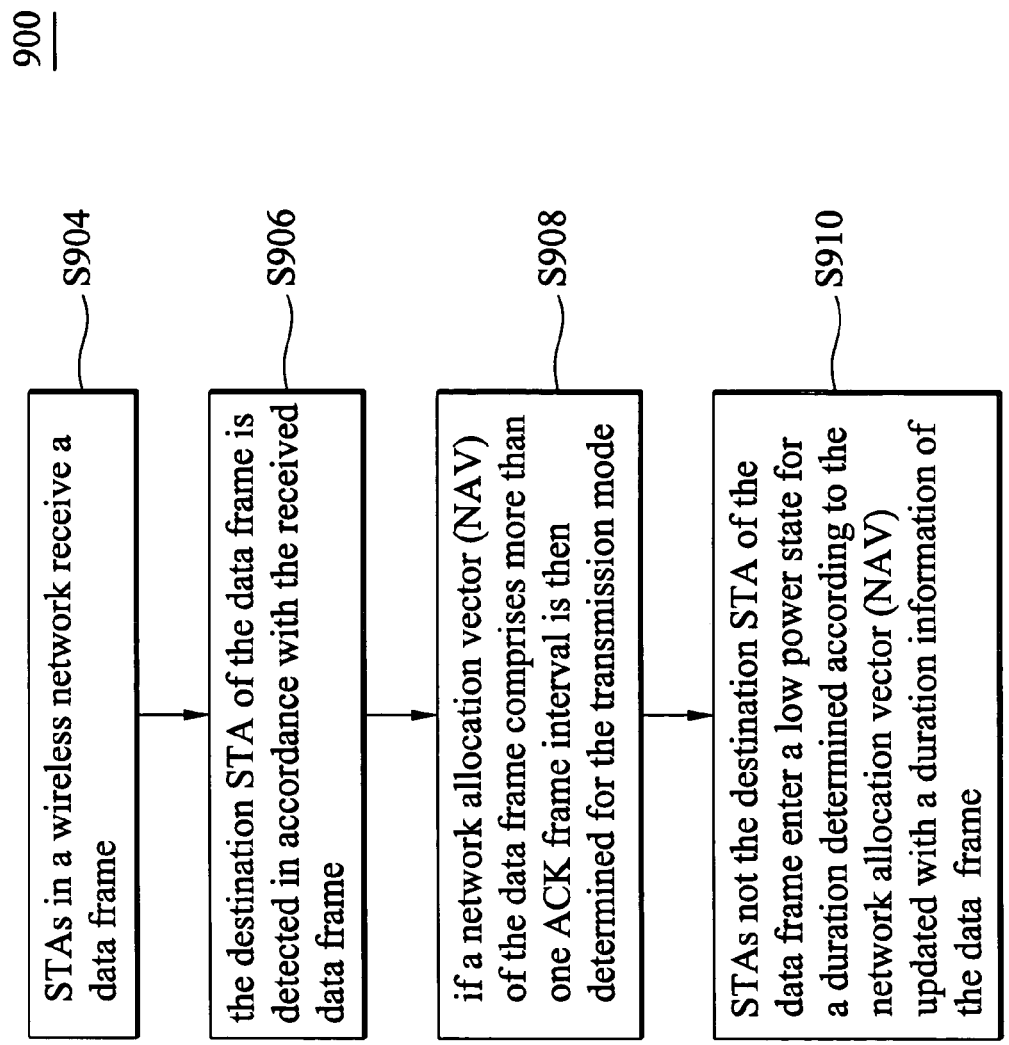
FIG. 9 is a flowchart of a power management method for a wireless network having a plurality of stations (STAs) according to another embodiment of the invention.

FIG. 9 is a flowchart of a power management method 900 for a wireless network having a plurality of stations (STAs) according to another embodiment of the invention. The STAs in the wireless network receive a data frame (step 904). The destination STA of the data frame is then detected in accordance with the received data frame (step 906). Whether a network allocation vector (NAV) updated with the duration information of the data frame comprises more than one ACK frame interval is then determined for the transmission mode (step 908). If the NAV updated with the duration information of the data frame comprises only one ACK frame interval, it indicates the transmission is a non-fragment transmission. Conversely, if the NAV updated with the duration information of the data frame comprises more than one ACK frame interval, it indicates the transmission is a burst of MSDU transmission. The STAs not the destination STA of the data frame then enter a low power state for a duration determined according to the network allocation vector (NAV) updated with the duration information of the data frame(step 910).

Figure 10:
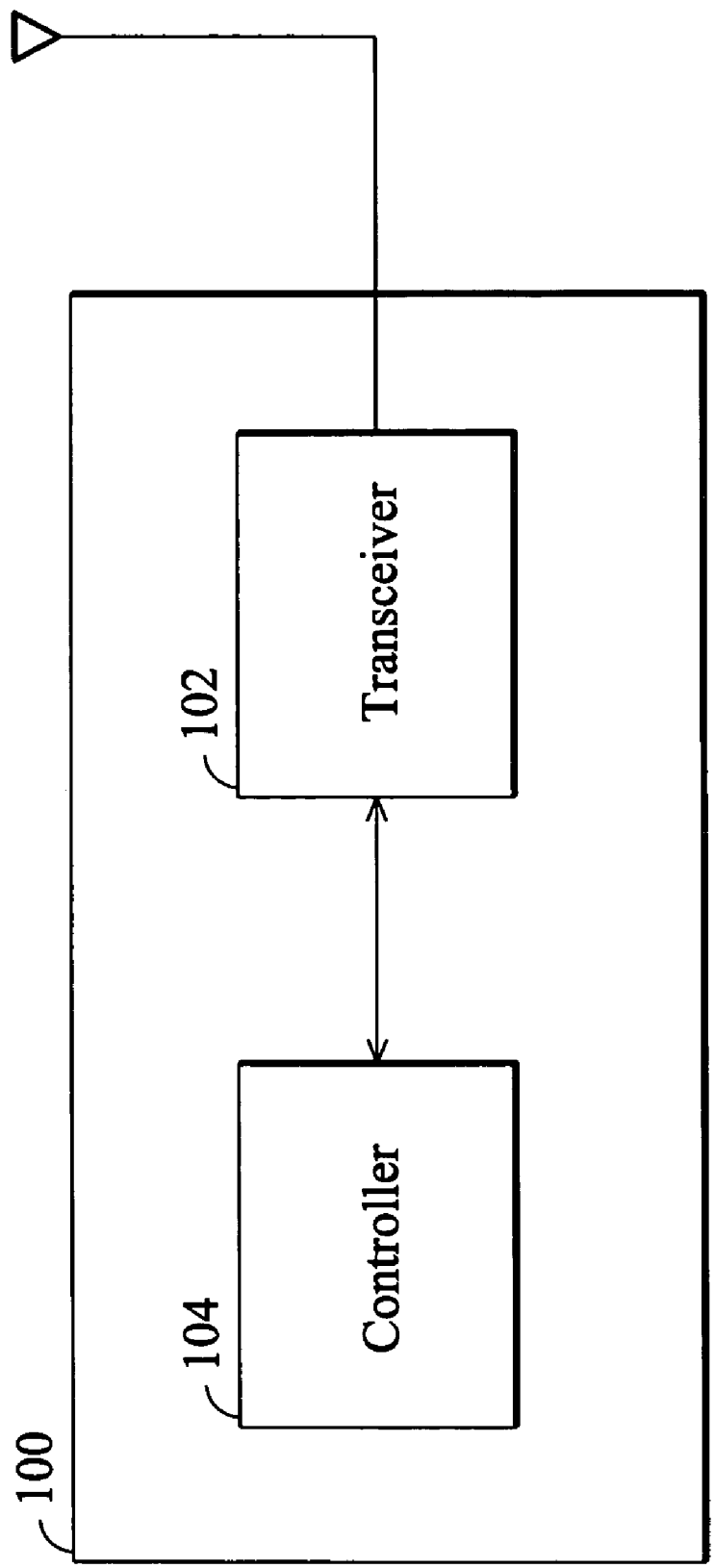
FIG. 10 is a schematic diagram of a power management device of each of a plurality of STAs in a wireless network according to another embodiment of the invention.

FIG. 10 is a schematic diagram of a power management device 100 of each STA in a wireless network, such as the STAs of FIG. 4, according to another embodiment of the invention. The power management device 100 comprises a transceiver 102 and a controller 104. The transceiver 102 receives a data frame (i.e. Data 0) transmitted from the source STA. The controller 104, coupled to the transceiver 102, detects a destination STA in accordance with the data frame. After detection, the controller 104 of STAs not the destination STA allows the STAs not the destination STA to enter a low power state for a PS duration determined according to a network allocation vector (NAV) thereof updated with duration information of the received data frame. The controller of each STA not the destination STA may further determine whether the network allocation vector (NAV) thereof, updated with a duration information of the received data frame, comprises more than one ACK frame interval to obtain the information of the transmission mode before entering the low power state. The PS duration value with respect to different transmission modes and design necessity are similar to that shown in FIGS. 5-8, and therefore are not further described.

The power management method of the invention utilizes the information contained in received data frames, allowing STAs not the intended destination STA to enter a low power state during transmission of data frames for other STAs, thereby. reducing power consumption.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method for a plurality of stations (STAs) in a Wireless Local Area Network (WLAN) comprising:
   receiving a data frame;
   detecting a destination STA in accordance with the data frame; and
   entering a low power state if not the destination STA for a first power-save (PS) duration determined according to a network allocation vector (NAV) of each STA not the destination STA, updated with a duration information of the received data frame;
   wherein the first PS duration is the NAV of each STA not the destination STA, updated with the duration information of the received data frame, comprising one Acknowledgment (ACK) frame interval, plus one short interframe space (SIFS) interval when the NAV comprises only one ACK frame interval.

2. The power management method as claimed in claim 1, wherein the STAs operating in the low power state do not transmit or receive frames.

3. The power management method as claimed in claim 1, further comprising allowing the STAs operating in the low power state to enter a fully powered state after the first PS duration.

4. The power management method as claimed in claim 1, wherein the destination STA transmits an ACK frame after a SIFS interval starting from the reception of the data frame.

5. The power management method as claimed in claim 1, wherein the NAV comprises more than one ACK frame interval.

6. The power management method as claimed in claim 5, wherein the transmission of the data frame is a burst of Mac service data unit (MSDU) transmission or a burst of Mac Protocol Data Unit (MPDU) transmission.

7. The power management method as claimed in claim 6, wherein a subsequent data frame is transmitted after a SIFS interval following a first ACK frame which is transmitted by the destination STA after a SIFS interval starting from the reception of the data frame.

8. The power management method as claimed in claim 7, wherein entering the low power state comprises entering the low power state after receiving the data frame and the first PS duration is the network allocation vector (NAV) of each STA not the destination STA, updated with the duration information of the received data frame minus one ACK frame interval.

9. The power management method as claimed in claim 8, further comprising allowing the STAs operating in the low power state to enter a fully powered state after the duration.

10. The power management method as claimed in claim 9, wherein the STAs entering the fully powered state receive a second ACK frame transmitted by the destination STA in response to the subsequent data frame.

11. The power management method as claimed in claim 10, where after entering the fully powered state, the method further comprises re-entering the low power state in the end of the second ACK frame for a second PS period of the NAV value of each STA not the destination STA, updated with a duration information of the second ACK frame minus one ACK frame interval.

12. The power management method as claimed in claim 5, wherein entering the low power state comprises entering the low power state after receiving the data frame and the first PS duration is the NAV of each STA not the destination STA, updated with the duration information of the received data frame, comprising the intervals of two Acknowledgment (ACK) frames and a subsequent data frame, plus three short interframe space (SIFS) intervals.

13. The power management method as claimed in claim 7, wherein entering the low power state comprises entering the low power state in response to the end of the first ACK frame and the first PS duration value is the NAV of each STA not the destination STA, updated with the duration information of the received data frame minus two ACK frame intervals and one SIFS interval.

14. The power management method as claimed in claim 13, further comprising allowing the STAs operating in the low power state to enter a fully powered state after the first PS duration.

15. The power management method as claimed in claim 14, wherein the STAs entering the fully powered state receive a second ACK frame transmitted by the destination STA in response to the subsequent data frame.

16. A power management method for a plurality of stations (STAs) in a Wireless Local Area Network (WLAN) comprising:
    receiving a data frame;
    detecting a destination STA in accordance with the data frame;
    determining whether a network allocation vector (NAV) of each STA not the destination STA, updated with a duration information of the received data frame, comprises more than one ACK frame interval; and
    entering a low power state if not the destination STA for a first PS duration determined according to the NAV thereof;
    wherein a subsequent data frame is transmitted after a SIFS interval following a first ACK frame which is transmitted by the destination STA after a SIFS interval starting from the reception of the data frame.

17. The power management method as claimed in claim 16, wherein the STAs operating in the low power state do not transmit or receive frames.

18. The power management method as claimed in claim 16, further comprising allowing the STAs operating in the low power state to enter a fully powered state after the first PS duration.

19. The power management method as claimed in claim 16, wherein the first PS duration is the NAV of each STA not the destination STA, updated with the duration information of the received data frame, comprising one Acknowledgment (ACK) frame interval, plus one short inter-frame space (SIFS) interval if the NAV does not comprise more than one ACK frame interval.

20. The power management method as claimed in claim 16, wherein a subsequent data frame is transmitted after a SIFS interval following a first ACK frame which is transmitted by the destination STA after a SIFS interval starting from the reception of the data frame.

21. The power management method as claimed in claim 20, wherein entering the low power state comprises entering the low power state in response to the end of the first ACK frame and the first PS duration value is the NAV of each STA not the destination STA, updated with the duration information of the received data frame minus two ACK frame intervals and one SIFS interval.

22. The power management method as claimed in claim 21, further comprising allowing the STAs operating in the low power state to enter a fully powered state after the first PS duration.

23. The power management method as claimed in claim 22, wherein the STAs entering the fully powered state receive a second ACK frame transmitted by the destination STA in response to the subsequent data frame.

24. The power management method as claimed in claim 20, wherein entering the low power state comprises entering the low power state after receiving the data frame and the first PS duration is the network allocation vector (NAV) of each STA not the destination STA, updated with the duration information of the received data frame minus one ACK frame interval.

25. The power management method as claimed in claim 24, further comprising allowing the STAs operating in the low power state to enter a fully powered state after the duration.

26. The power management method as claimed in claim 25, wherein the STAs entering the fully powered state receive a second ACK frame transmitted by the destination STA in response to the subsequent data frame.

27. The power management method as claimed in claim 16, wherein if the NAV comprises more than one ACK frame interval, entering the low power state comprises entering the low power state after receiving the data frame and the first PS duration is the NAV of each STA not the destination STA, updated with the duration information of the received data frame, comprising the intervals of two Acknowledgment (ACK) frames and a subsequent data frame, plus three short inter-frame space (SIFS) intervals.

28. A power management device for a plurality of stations (STAs) in a Wireless Local Area Network (WLAN), comprising:
means for receiving a data frame;
means for detecting a destination STA in accordance with the data frame;
means for determining if the destination STA; and
means for allowing the STAs to enter a low power state if not the destination STA for a first power-save (PS) duration determined according to a network allocation vector (NAV) of each STA not the destination STA, updated with a duration information of the received data frame;
wherein the first PS duration is the NAV of each STA not the destination STA, updated with the duration information of the received data frame, comprising one Acknowledgment (ACK) frame interval, plus one short inter-frame space (SIFS) interval when the NAV comprises only one ACK frame interval.

29. The power management device as claimed in claim 28, wherein the STAs operating in the low power state do not transmit or receive frames.

30. The power management device as claimed in claim 28, further comprising means for allowing the STAs operating in the low power state to enter a fully powered state after the first PS duration.

31. The power management device as claimed in claim 28, wherein the destination STA transmits an ACK frame after a SIFS interval starting from the reception of the data frame.

32. The power management device as claimed in claim 28, wherein the NAV comprises more than one ACK frame interval.

33. The power management device as claimed in claim 32, wherein the transmission of the data frame is a burst of Mac service data unit (MSDU) transmission or a burst of Mac Protocol Data Unit (MPDU) transmission.

34. The power management device as claimed in claim 33, wherein a subsequent data frame is transmitted after a SIFS interval following a first ACK frame which is transmitted by the destination STA after a SIFS interval starting from the reception of the data frame.

35. The power management device as claimed in claim 34, wherein the means for entering the low power state allows the STAs not the destination STA to enter the low power state in response to the end of the first ACK frame and the first PS duration value is the NAV of each STA not the destination STA, updated with the duration information of the received data frame minus two ACK frame intervals and one SIFS interval.

36. The power management device as claimed in claim 35, further comprising means for allowing the STAs operating in the low power state to enter a fully powered state after the first PS duration.

37. The power management device as claimed in claim 36, wherein the STAs entering the fully powered state receive a second ACK frame transmitted by the destination STA in response to the subsequent data frame.

38. The power management device as claimed in claim 34, wherein the means for entering the low power state allows the STAs not the destination STA to enter the low power state after receiving the data frame and the first PS duration is the network allocation vector (NAV) of each STA not the destination STA, updated with the duration information of the received data frame minus one ACK frame interval.

39. The power management device as claimed in claim 38, further comprising means for allowing the STAs operating in the low power state to enter a fully powered state after the duration.

40. The power management device as claimed in claim 39, wherein the STAs entering the fully powered state receive a second ACK frame transmitted by the destination STA in response to the subsequent data frame.

41. The power management device as claimed in claim 40, where the device further comprises means for re-entering the low power state after entering the fully powered state in the end of the second ACK frame for a second PS period of the NAV value of each STA not the destination STA, updated with a duration information of the second ACK frame minus one ACK frame interval.

42. The power management device as claimed in claim 32, wherein the means for entering the low power state allows the STAs not the destination STA to enter the low power state after receiving the data frame and the first PS duration is the NAV of each STA not the destination STA, updated with the duration information of the received data frame, comprising the intervals of two Acknowledgment (ACK) frames and a subsequent data frame, plus three short inter-frame space (SIFS) intervals.

43. A power management device for each of a plurality of stations (STAs) in a Wireless Local Area Network (WLAN) comprising:
means for receiving a data frame;
means for detecting a destination STA in accordance with the data frame;
means for determining if the destination STA;
means for determining whether a network allocation vector (NAV) of each STA not the destination STA, updated with a duration information of the received data frame, comprises more than one ACK frame interval; and
means for allowing the STAs to enter a low power state if not the destination STA for a first PS duration determined according to the NAV thereof;
wherein when the NAV comprises more than one ACK frame interval, the transmission of the data frame is a burst of Mac service data unit (MSDU) transmission or a burst of Mac Protocol Data Unit (MPDU) transmission.

44. The power management device as claimed in claim 43, wherein the STAs operating in the low power state do not transmit or receive frames.

45. The power management device as claimed in claim 43, further comprising means for allowing the STAs operating in the low power state to enter a fully powered state after the first PS duration.

46. The power management device as claimed in claim 43, wherein the first PS duration is the NAV of each STA not the destination STA, updated with the duration information of the received data frame, comprising one Acknowledgment (ACK) frame interval, plus one short inter-frame space (SIFS) interval if the NAV does not comprise more than one ACK frame interval.

47. The power management device as claimed in claim 43, wherein a subsequent data frame is transmitted after a SIFS interval following a first ACK frame which is transmitted by the destination STA after a SIFS interval starting from the reception of the data frame.

48. The power management device as claimed in claim 47, wherein means for entering the low power state allows the STAs not the destination STA to enter the low power state in response to the end of the first ACK frame and the first PS duration value is the NAV of each STA not the destination STA, updated with the duration information of the received data frame minus two ACK frame intervals and one SIFS interval.

49. The power management device as claimed in claim 48, further comprising means for allowing the STAs operating in the low power state to enter a fully powered state after the first PS duration.

50. The power management device as claimed in claim 49, wherein the STAs entering the fully powered state receive a second ACK frame transmitted by the destination STA in response to the subsequent data frame.

51. The power management device as claimed in claim 47, wherein means for entering the low power state allows the STAs not the destination STA to enter the low power state after receiving the data frame and the first PS duration is the network allocation vector (NAV) of each STA not the destination STA, updated with the duration information of the received data frame minus one ACK frame interval.

52. The power management device as claimed in claim 51, further comprising means for allowing the STAs operating in the low power state to enter a fully powered state after the duration.

53. The power management device as claimed in claim 52, wherein the STAs entering the fully powered state receive a second ACK frame transmitted by the destination STA in response to the subsequent data frame.

54. The power management device as claimed in claim 43, wherein if the NAV comprises more than one ACK frame interval, the means for entering the low power state allows the STAs not the destination STA to enter the low power state after receiving the data frame and the first PS duration is the NAV of each STA not the destination STA, updated with the duration information of the received data frame, comprising the intervals of two Acknowledgment (ACK) frames and a subsequent data frame, plus three short inter-frame space (SIFS) intervals.

* * * * *